Jan. 1, 1935. D. B. McCLOUD Re. 19,410
EXPLOSIVE CARTRIDGE
Original Filed Oct. 27, 1932 2 Sheets-Sheet 1
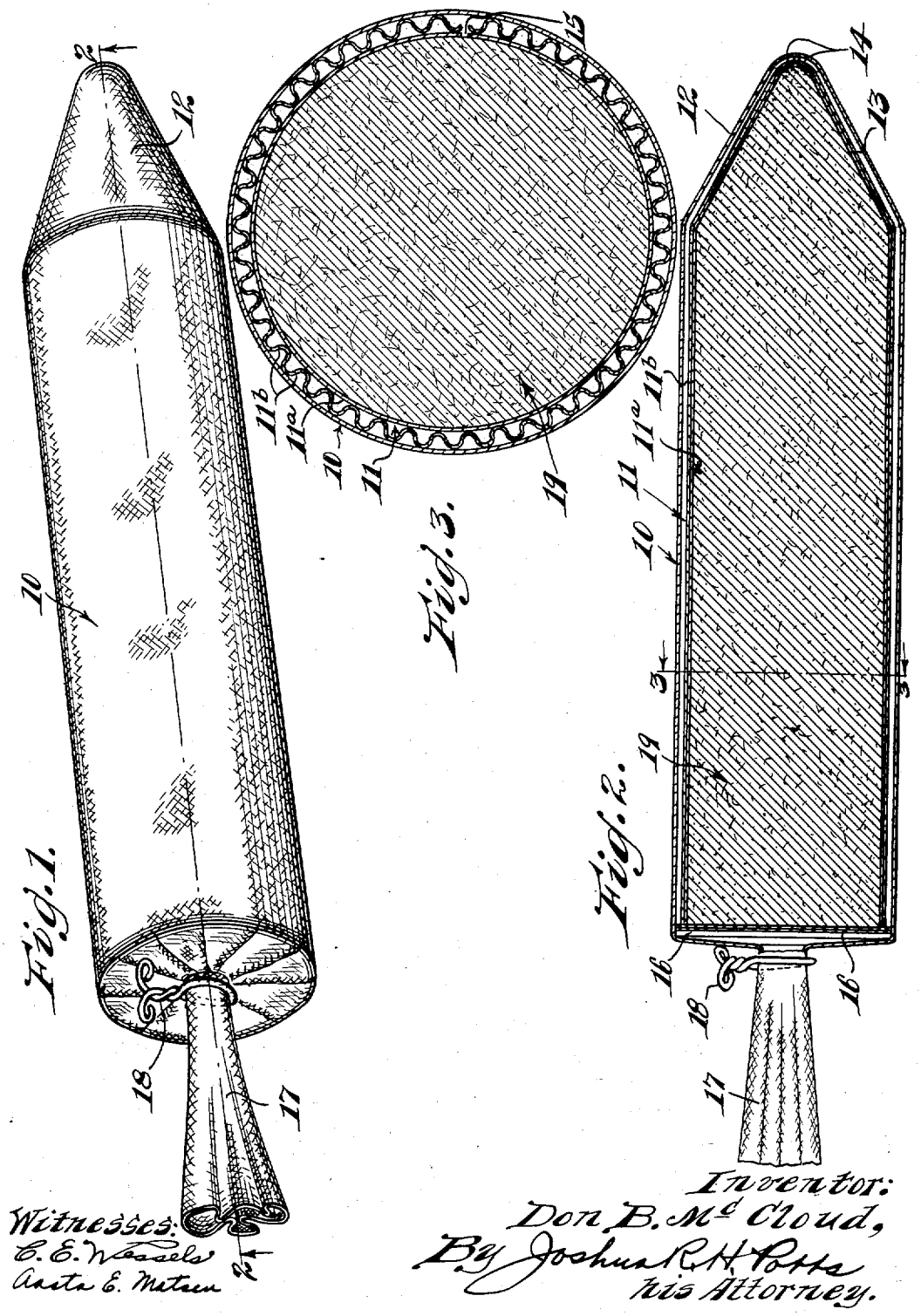

Jan. 1, 1935. D. B. McCLOUD Re. 19,410
EXPLOSIVE CARTRIDGE
Original Filed Oct. 27, 1932 2 Sheets-Sheet 2
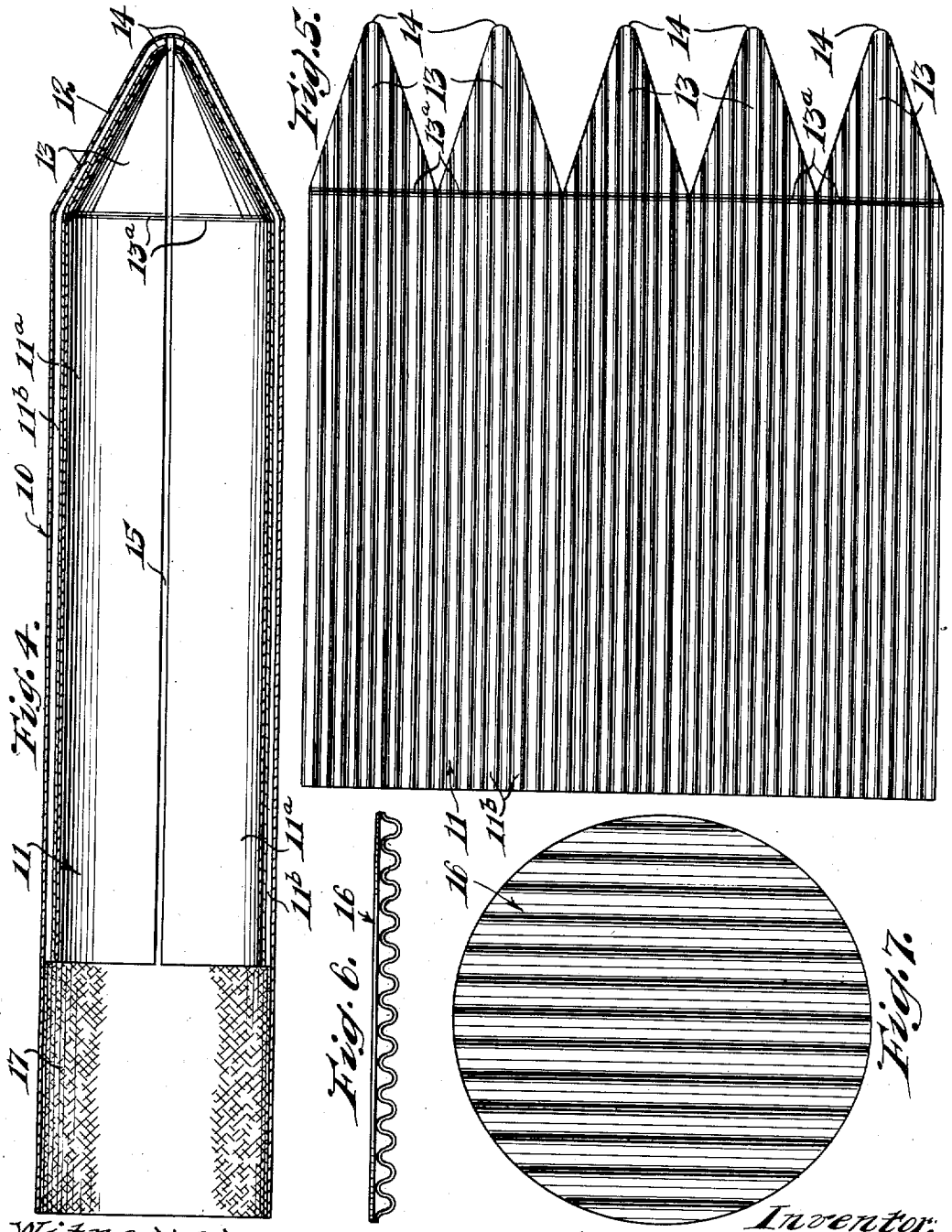
Witnesses:
C. E. Wessels
Anita E. Metzen
Inventor:
Don B. McCloud,
By Joshua R. H. Potts
his Attorney.

Reissued Jan. 1, 1935

Re. 19,410

UNITED STATES PATENT OFFICE 19,410

EXPLOSIVE CARTRIDGE

Don B. McCloud, Carbondale, Ill.

Original No. 1,923,496, dated August 22, 1933, Serial No. 639,757, October 27, 1932. Application for reissue June 18, 1934, Serial No. 731,158

6 Claims. (Cl. 102—6)

This invention relates to an explosive cartridge, more particularly a cartridge or measured charge unit containing an explosive adapted for use in open pit or strip mining and quarrying operations. An explosive cartridge of the character to which the present invention relates may comprise an outer cloth covering or container made of canvas or other suitable material and filled with a fibrous, granular, or powdered carbonaceous material of porous character, harmless in itself, but when impregnated or saturated with a penetrative combustion supporting element of a certain character, such as liquid oxygen, also harmless by itself, becomes readily combustible and highly explosive.

The particular explosive to which the present invention relates is known as "liquid oxygen explosive," because of its constituent mixture of porous carbonaceous material and liquid oxygen, and for brevity it is commonly referred to as "L. O. X." There are many differently proportioned mixtures of inflammable materials and liquid oxygen, all within the same general class or category and properly identified as liquid oxygen explosive, but the most widely used inflammable absorbents for liquid oxygen explosive cartridges are lamp blacks, carbon blacks, and certain types of granular carbon.

Certain mixtures are more sensitive to shock or impact than others, some being of exceedingly high sensitivity, and premature explosions during blast loading operations have caused the loss of a number of lives. There are many theories as to the cause of these premature explosions, some of which are conflicting, but a common theory is that such explosions are caused by certain shocks or impacts occurring accidentally as well as through deliberate manipulation during the loading operations. It is known that liquid oxygen explosives made of finely divided lamp blacks or the like are considerably more sensitive to shock than other types of this explosive made from coarser granular carbons or other larger particled materials. The finely divided lamp blacks are the most desirable on account of their ideal absorbent properties, the more intimate mixture of carbon and oxygen made possible by their minute structure, and their superior oxygen retaining qualities, all of which advantages promote the efficiency of the explosive. Thus, on the one hand, it will be seen that the mixture including the granular or coarser particled carbonaceous material is less sensitive to shock and consequent premature explosion, but correspondingly less powerful for blasting operations, while on the other hand, the more powerful and efficient mixture comprising the finely particled lamp blacks is accordingly more sensitive to impact and premature explosion.

Heretofore, the apparent object of much of the research work in connection with the liquid oxygen explosives has been to discover and develop an ideal carbonaceous absorbent material of relatively low sensitivity and inherently safe from the standpoint of impact and prevention of premature explosions. The addition of moisture and inert de-sensitizing materials to the active ingredients of liquid oxygen explosive cartridges has been advocated as a means of decreasing handling hazards by making the explosive less sensitive to shock. Such practice, however, while decreasing the possibility of premature explosion, also detracts from the blasting power and efficiency of the explosive. Also, as hereinbefore stated, the relatively coarse particled carbonaceous absorbent material reduces the sensitivity of the cartridge but at the same time correspondingly decreases its efficiency.

Since its introduction a few years ago, liquid oxygen explosive, or "L. O. X.," as it is more commonly termed, has been used quite successfully by several of the leading coal strippers and in other mining or quarrying operations for the blasting and removal of overburden, as well as in other industrial operations, it being found very efficient for the purpose but, as above noted, requiring due care and skill in preparation and loading operations to prevent premature explosion.

In the past, and more particularly in strip mining or quarrying operations, in which liquid oxygen explosive has been used as above noted, it has been the customary practice to sink vertical holes in the overburden and then load the holes with the explosive cartridges, stem and detonate. More recently, drilling machines have been produced to drill horizontal holes ranging from four to seven inches in diameter and up to eighty feet in length. Said machines are placed in the pit or cut and the holes are drilled horizontally in the lower portion of the overburden to whatever dimensions desired, within the above named limit. The explosive cartridges are then pushed into these holes, stemmed and shot, thereby breaking up the overburden so that it can be handled efficiently by power shovels employed to remove it. The principal advantage claimed for this new blasting procedure, which is manipulated from within the pit or cut, is that it is more economical and efficient than the old procedure involving the use of vertically operated drills and with all the blasting handled on the high wall or bank.

In the use of liquid oxygen explosive in horizontal drill holes four inches or more in diameter and over thirty feet deep, difficulties are involved which the present invention overcomes. As hereinbefore stated, the explosive cartridge as finally prepared for use is impregnated or saturated with liquid oxygen. The normal temperature of liquid oxygen is approximately from 182 to 184 degrees below zero, centigrade, or about 300 degrees below zero, Fahrenheit, but when exposed to higher temperatures it evaporates or boils away. Now, in the production and use of liquid oxygen explosive cartridges, of say four inches in diameter, such cartridges must be detonated generally within thirty minutes from the time they are removed from their bath of liquid oxygen and exposed to ordinary temperatures, otherwise the evaporation of the liquid oxygen will reach the point where the explosive efficiency of the cartridge is greatly impaired.

In the case of vertical drill holes, cartridges can be dropped down therein in rapid succession, and a comparatively heavy charge loaded and stemmed in the holes easily within the prescribed thirty minute loading time. However, in the case of horizontal holes, the process of loading is somewhat slower, because the explosive cartridge must be pushed in the hole by means of a rod or pole, sometimes one cartridge at a time; and, instead of merely shoveling in the stemming, as in the vertical holes, the stemming must be pushed into the hole in a like manner after the cartridges, which operation greatly increases the time required for loading as compared with the vertical holes according to the older practice.

There is still another condition to be coped with, and that is the frequent presence of moisture or water within the drill holes, due either to seepage or the use of water in the drilling operation, or both. Therefore, due to its extremely cold temperature, the cartridge is liable to freeze to the wall of the drill hole. This freezing lodgement is more liable to occur in a horizontal drill hole, because in a vertical drill hole the speed with which a cartridge gravitates after being dropped usually prevents it from freezing to the wet wall of the hole and thereby sticking or lodging therein, whereas, in loading a horizontal hole, the cartridge must necessarily be pushed therein comparatively slowly and with exceeding care and, therefore, may come to rest momentarily during its progress and thereby become frozen to the wall, if wet.

It may be here noted that it is hazardous to attempt to dislodge, by forcible means, a cartridge frozen as above set forth, or otherwise lodged in a drill hole as is liable to occur if the cartridge is relatively flexible or distortable so as to be deformed by pushing the same with a pole or ramming tool during the loading operation.

Experimentation and subsequent practical development have produced the present invention, one of the objects of which is to provide for the utilization of the finely divided carbonaceous material, preferably lamp black or carbon black, to secure the admittedly high efficiency in a liquid oxygen explosive cartridge by providing shock absorbing and cushioning means in a wrapper or container whereby to minimize and prevent premature explosions to a reasonably safe degree.

Another object of the invention is to secure rigidity and preservation of form and surface contour of the cartridge.

A still further object is to retard evaporation of the liquid oxygen and thereby prolong the saturated life of the explosive and at the same time provide effective insulation whereby to maintain the extremely cold temperature within the cartridge and prevent transmission of the same to the exterior thereof.

With the foregoing objects in view, the invention consists broadly in means for carrying out the several provisions noted; in the production of a cartridge having a specially combined stiffening and form preserving, shock absorbing and cushioning, and insulative lining or sheath; and in the structural parts and combinations and arrangements of such parts as hereinafter described and set forth with particularity in the appended claims.

In the accompanying drawings, illustrating a practical adaptation of the invention,—

Fig. 1 is a perspective view of a completed explosive cartridge embodying the present invention;

Fig. 2 is a longitudinal section, taken on or about the line 2—2 of Fig. 1;

Fig. 3 is a transverse section, on an enlarged scale, the line of section being indicated at 3—3 in Fig. 2;

Fig. 4 is a longitudinal sectional view of the cartridge container with the filler removed and in the condition preparatory to receiving the filler;

Fig. 5 is a plan view of the shock absorbent and insulative lining blank as preliminarily prepared and detached from the cartridge;

Fig. 6 is an edge view of an end closure and padding disc for the cartridge; and Fig. 7 is a face view of said disc.

Referring now to the adaptation of the invention as illustrated in the drawings, the numeral 10 designates a cloth bag made of osnaburg, duck, canvas, or other suitable fabric of like tensile strength and characteristic porosity, to serve as an outer form producing and retaining cover possessing the requisite flexibility in itself for facilitating its application to the cartridge and in maintaining the normal shape of the cartridge with the aid of an additional element in the form of a liner or sheath constituting the more essential structural feature of the present invention and to be presently described.

Prior to the present invention the outer casing of a liquid oxygen explosive cartridge was, in many cases, only filled with the absorbent carbonaceous material which was packed therein so as to limit the flexibility of the cartridge to some extent, and varying according to the density or compactness of the filler, but, of course, without absolute rigidity. In the use of cartridges thus constructed and prepared premature explosions have occurred in the hole loading operations, due to shocks or impacts involved in forcible dislodgement of cartridges stuck in the bore holes. Aside from the liability of lodging engagement of the cartridge due to irregularities in the drill hole wall, there is also danger of lodgement due to the freezing of the cartridge to the wall in cases where there is excessive moisture or water present.

More recently, stiffening of the cartridge has been attained by providing the outer cloth casing or covering with a liner comprising a sheet of material, such as chipboard, cardboard, juteboard, strawboard, or what is commonly known as pressboard, or the like, of sufficient flexibility so as to be bent for insertion in the outer covering or container conformably to the contour of the cartridge. While the liner or sheath within the covering stiffens and adds rigidity to the cartridge to a considerable degree, thereby facilitating the sliding of the cartridge along a horizontal drill hole, and, by its insulative and cushioning qualities, effectively reducing the liability of premature explosions in the loading operation and other handling of the cartridge, the measure of safety is not complete, and there is still room for improvement in the provisions for the safe handling and use of the explosive. To this end, therefore, as hereinbefore pointed out, the invention has for its principal object to secure and maintain ample rigidity of the cartridge and, further, to provide cushioning means rendering the cartridge less liable to premature explosion by accidental or incidental shocks in the ordinary handling of the explosive in storage and transportation, as well as in loading operations, and at the same time provide for insulation to prevent rapid evaporation of the liquid content of the cartridge and also prevent freezing of the cartridge to the wall of the drill hole.

The cartridge produced in accordance with the present invention is provided with a suitable liner or sheath of material having both cushioning and insulating qualities, such as corrugated or embossed chipboard, pulpboard, cardboard, juteboard, strawboard, or the like, the preferred practical material being the ordinary commercial corrugated straw or paper board used for linings and in the construction of packing boxes, cartons, and the like.

The ideal lining material is the single faced corrugated board, or, in other words, the ordinary commercial material comprising a flat plain sheet or layer 11[a] and a corrugated sheet or layer 11[b] which is attached, where its alternate convolutions occur, to the flat sheet by a suitable adhesive, the material, of itself, being a regular commercial commodity and not constituting any part of the present invention except in the particular use for which it is employed.

Preferably the corrugations run lengthwise of the cartridge and the corrugated layer portion of the liner is disposed outwardly or next to the outer casing or container 10, this being for the dual purpose of facilitating the bending of the liner to conform to the curvature of the cartridge the major portion of which is substantially cylindrical, and to afford insulative air spaces between the liner and the outer casing or container, the corrugations also functioning as a cushion to effectively absorb shocks.

In the usual and more preferred form of the cartridge it is generally cylindrical in shape throughout its extent except that it is formed projectile-like or with a tapered nose at one end, by which formation the cartridge more readily enters the drill hole and its movement into exploding position is greatly facilitated. The liner, or cushioning and insulating sheath, as it may be also properly called, is formed in the original blank so as to conform to the tapered end portion of the outer casing or container 10, which end portion of the casing, designated by the numeral 12, is accordingly shaped and closed.

The liner or cushioning and insulating sheath 11 is originally produced preferably in the form of a substantially rectangular blank, as shown more clearly in Fig. 5 of the drawings, one end portion of the blank being serrated to provide a multiplicity of wedge-shaped portions 13, said tapered portions or fingers, as they may be termed, being in sufficient number to readily conform to the shape of the tapered nose portion 12 of the cartridge casing or container 10, and the ends of said portions 13 being either somewhat rounded, as at 14, or they may obviously be pointed or cut off squarely, as the particular formation of the ends is of no material consequence, for in some cases the meeting ends of the portions 13 when the liner is applied in the outer casing may overlap, while in other cases the end portions may not quite meet. In fact, there is but little liability of accidental explosion by contact in the region of the extreme end of the nose portion 12 of the cartridge with an obstruction, and, by having an opening between the ends of the liner portions 13, the saturation of the absorbent filler of the cartridge is facilitated. Owing to the disposition of the corrugations of the liner or sheath 11 lengthwise of the cartridge, thereby making it difficult to bend the tapered fingers or tongue portions 13 at the bases thereof, the blank is preferably scored transversely, as at 13[a].

In the preferred construction the lining blank 11 is made of a width so that when fitted conformably inside the outer casing or container bag 10 there is a space between the meeting longitudinal edges of the blank forming a longitudinal slot at one side of the lining, as shown more clearly at 15 in Fig. 4 of the drawings. The purpose of this slot is to obviate the necessity for perforating or aperturing the blank, which would be necessary in order to permit penetration and saturation of the absorbent contents of the cartridge when placed in the soaking box or chamber of the device in which the liquid oxygen is supplied. The slot 15 may be relatively narrow, in practice averaging about one-eighth of an inch in width, by which dimension ample opening is provided for the entrance of the liquid oxygen during the saturation process, and yet exudation of the carbonaceous absorbent material is practically prevented, both before and after saturation.

In the production of the cartridge, after the outer casing or container bag 10 has the cushioning and insulating lining or sheath 11 placed therein it is filled with the absorbent material, indicated at 19 in Figs. 2 and 3 of the drawings, either the extremely fine particled or coarse granular, as the case may be, and suitably packed according to the nature of the filler and the required density, after which a disc 16 of material similar to that comprising the lining 11 is placed in the open end of the outer casing and against the end of the lining, said disc 16 preferably being of a diameter substantially the same as the interior diameter of the bag 10 and the corrugations being disposed outwardly. After the disc is in place the end portion 17 of the bag 10 extending beyond the lining material is gathered and tied by a cord or a piece of copper wire, as at 18, and shown more clearly in Figs. 1 and 2 of the drawings, said gathered end portion 17 affording a convenient hand hold for carrying the cartridge.

By the provision of the corrugated lining and the similarly corrugated end closure disc 16, the impregnated or saturated cartridge may be handled with considerably less care than cartridges of this type of explosive not so provided, with but little or no liability of accidental or premature explosion from ordinary shocks due to impacts in the handling thereof. The lining of the present invention also greatly minimizes the liability of premature explosion in the loading operation by practically eliminating the possibility of the cartridge lodging in the drill hole, as its insulating quality prevents radiation of the extremely cold temperature and consequent freezing to the wall in cases where the cartridge is applied in a drill hole containing excess moisture or water resulting from the drilling operation or seepage as hereinbefore pointed out. The further advantage of the insulating feature of the lining material or sheath is the prevention of the rapid evaporation of the liquid oxygen, thereby prolonging the efficiently active explosive life of the cartridge, which is especially desirable in a cartridge of this character, particularly in loading horizontal drill holes and the like whereby more time and care are required in placing and positioning the cartridge than in the vertical drill holes in which the cartridges are merely dropped instead of having to be pushed into place.

Experimentation has shown conclusively that sensitivity to shock in a liquid oxygen explosive cartridge is materially reduced by encasing the explosive ingredients in a relatively rigid shock absorbing sheath, whether the carbonaceous absorbent filler is relatively fine or coarse particled. Actual tests of the explosive in an impact machine have proven that a cartridge made of finely divided lamp black, which is conceded by all authorities as having the highest absorbent properties and efficiency and being the most sensitive to shock in a cartridge of this character, if encased in a cushioning sheath of the character of that set forth in the foregoing specification, is approximately one-half as sensitive to impact and shock as a cartridge containing an identical carbonaceous filler but not protected by such a sheath or cover. Hence, the practical advantage of a cartridge produced in accordance with the present invention is clearly apparent, regardless of the particled consistency of the absorbent carbonaceous filler, but especially most advantageous in the use of the extremely fine particled ingredients.

Obviously, various carbonaceous materials may be used in the production of the cartridge, and in different degrees of fineness and density of packing, as hereinbefore described, and the outer casing and lining materials may be varied considerably while maintaining the combined form preserving, shock absorbing, and insulating qualities, all within the spirit and scope of the invention, as defined by the appended claims. The invention, therefore, except in the use of liquid oxygen as the saturating element, is not limited to the specific materials nor construction and arrangement shown in the drawings.

Having thus described my invention, what I claim as new and desire to secure by Letters Patent is:

1. A liquid oxygen explosive cartridge of the character described, comprising a substantially cylindrically formed outer retaining casing of cloth, and a lining of corrugated stiffening, shock absorbing and insulating sheet material, the corrugations of said lining material extending longitudinally and being disposed outwardly and in cooperative engagement with the outer casing cloth whereby to produce longitudinal insulative air spaces, and functioning as a cushioning pad between the outer cloth casing and the filler ingredients of the cartridge.

2. A liquid oxygen explosive cartridge of the character described, generally cylindrical in body formation, said cartridge comprising an outer retaining casing of cloth, a carbonaceous absorbent filler impregnated or saturated with liquid oxygen, and a lining of stiffening and insulating sheet material interposed between said outer cloth casing and saturated absorbent filler, the longitudinal edges of said lining sheet meeting in spaced relation whereby to provide a slotted opening in the lining for the impregnation and saturation of the carbonaceous filler with the liquid oxygen.

3. A liquid oxygen explosive cartridge of the character described, generally cylindrical in body formation and having a tapered projectile-like end portion, said cartridge comprising an outer retaining casing of cloth, a carbonaceous absorbent filler impregnated or saturated with liquid oxygen, and a lining of stiffening and insulating sheet material interposed between said outer cloth casing and saturated absorbent filler, the longitudinal marginal edges of said lining sheet meeting in spaced relation whereby to provide a longitudinally slotted opening in the lining for the impregnation and saturation of the carbonaceous filler with the liquid oxygen, the end portion of said lining being serrated to provide tapered portions meeting and cooperating conformably with the tapered end portion of the outer casing.

4. A liquid oxygen explosive cartridge comprising a porous cloth outer form producing and retaining case and a carbonaceous absorbent filler for saturation with liquid oxygen, and a liner or sheath of characteristic material cooperating with said case conformably to the shape of the cartridge and having inherent form preserving, shock absorbing, and insulating qualities, said liner or sheath having an open portion permitting entrance of the saturating element.

5. A liquid oxygen explosive cartridge of the character described, generally cylindrical in body formation, said cartridge comprising an outer retaining casing of cloth, a carbonaceous absorbent filler impregnated or saturated with liquid oxygen, and an unperforated lining of stiffening sheet material interposed between said outer cloth casing and saturated absorbent filler, the longitudinal edges of said lining sheet providing an opening in the lining for the impregnation and saturation of the carbonaceous filler with the liquid oxygen.

6. A liquid oxygen explosive cartridge of the character described, generally cylindrical in body formation, said cartridge comprising an outer retaining casing of cloth, a carbonaceous absorbent filler impregnated or saturated with liquid oxygen, and an unperforated lining of stiffening sheet material having sufficient flexibility to be bent for insertion in said outer casing conformably to the contour of the cartridge, said lining interposed between said outer coth casing and saturated absorbent filler, the longitudinal edges of said lining sheet providing an opening in the lining for the impregnation and saturation of the carbonaceous filler with the liquid oxygen.

DON B. McCLOUD.